United States Patent
Tomita et al.

(10) Patent No.: US 7,981,228 B2
(45) Date of Patent: *Jul. 19, 2011

(54) JOINED BODY AND METHOD FOR MANUFACTURING THE SAME

(75) Inventors: Takahiro Tomita, Chita (JP); Shinji Kawasaki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 730 days.

This patent is subject to a terminal disclaimer.

(21) Appl. No.: 11/962,965

(22) Filed: Dec. 21, 2007

(65) Prior Publication Data

US 2008/0152863 A1 Jun. 26, 2008

(30) Foreign Application Priority Data

Dec. 25, 2006 (JP) .................... 2006-348045
Oct. 30, 2007 (JP) .................... 2007-281403

(51) Int. Cl.
*C04B 33/32* (2006.01)
*C04B 37/00* (2006.01)
*B32B 3/12* (2006.01)
*B32B 3/26* (2006.01)

(52) U.S. Cl. ............ 156/89.11; 428/116; 428/304.4; 428/34.5; 264/630; 55/523; 106/469; 106/626

(58) Field of Classification Search ............ None
See application file for complete search history.

(56) References Cited

U.S. PATENT DOCUMENTS

| | | | |
|---|---|---|---|
| 2,637,675 A | 5/1953 | Bain | |
| 2,933,552 A | 4/1960 | Schurecht | |
| 4,090,881 A | 5/1978 | Keel et al. | |
| 5,547,749 A | 8/1996 | Chiba et al. | |
| 5,914,187 A | 6/1999 | Naruse et al. | |
| 6,669,751 B1 | 12/2003 | Ohno et al. | |
| 7,138,168 B2 | 11/2006 | Fujita | |
| 2002/0197193 A1 | 12/2002 | Harada et al. | |
| 2004/0045267 A1 | 3/2004 | Ichikawa et al. | |
| 2004/0097370 A1 | 5/2004 | Ichikawa et al. | |
| 2004/0144962 A1 | 7/2004 | Hayakawa et al. | |
| 2005/0011174 A1 | 1/2005 | Hong et al. | |
| 2005/0076626 A1* | 4/2005 | Kudo et al. | ............ 55/523 |
| 2005/0079975 A1 | 4/2005 | Fujita | |

(Continued)

FOREIGN PATENT DOCUMENTS

EP 0 965 735 A2 12/1999

(Continued)

OTHER PUBLICATIONS

Xanthos, Functional Fillers for Plastics, 2010, Wiley-Vch (Publisher), 2nd edition, pp. 22-23.*

(Continued)

*Primary Examiner* — David R Sample
*Assistant Examiner* — Nicole T Gugliotta
(74) *Attorney, Agent, or Firm* — Oliff & Berridge, PLC

(57) ABSTRACT

There is provided a joined body formed by unitarily joining two or more members to be joined by means of a bonding material layer formed of a bonding material composition. The bonding material composition contains flat particles, non-flat particles, and an inorganic adhesive as main components, and the bonding material layer has a Young's modulus of 3 GPa or more. The joined body can suppress deformation of members to be joined due to thermal distortion with the bonding material layer, hardly causes rupture of the bonding material layer due to stress, and has excellent thermal shock resistance.

17 Claims, 2 Drawing Sheets

U.S. PATENT DOCUMENTS

| | | | |
|---|---|---|---|
| 2005/0109023 A1 | 5/2005 | Kudo et al. | |
| 2005/0221053 A1 | 10/2005 | Tomita et al. | |
| 2005/0255288 A1 | 11/2005 | Noguchi et al. | |
| 2006/0166820 A1* | 7/2006 | Ogyu et al. | 502/439 |
| 2006/0216466 A1 | 9/2006 | Yoshida | |
| 2006/0216467 A1 | 9/2006 | Yoshida | |
| 2006/0228520 A1 | 10/2006 | Masukawa et al. | |
| 2006/0230732 A1* | 10/2006 | Kunieda | 55/523 |
| 2006/0290036 A1* | 12/2006 | Kaneda et al. | 264/628 |
| 2007/0039298 A1 | 2/2007 | Tokumaru | |
| 2007/0092692 A1 | 4/2007 | Masukawa et al. | |
| 2007/0160825 A1 | 7/2007 | Miyakawa et al. | |
| 2008/0138568 A1* | 6/2008 | Tomita et al. | 428/116 |
| 2008/0152863 A1 | 6/2008 | Tomita et al. | |
| 2008/0248238 A1* | 10/2008 | Tomita et al. | 428/116 |
| 2009/0041975 A1* | 2/2009 | Kodama et al. | 428/116 |
| 2009/0202779 A1 | 8/2009 | Yoshida | |

FOREIGN PATENT DOCUMENTS

| | | |
|---|---|---|
| EP | 1 142 619 A1 | 10/2001 |
| EP | 1 452 511 A1 | 9/2004 |
| EP | 1 479 882 A1 | 11/2004 |
| EP | 1 508 355 A1 | 2/2005 |
| EP | 1 508 356 A1 | 2/2005 |
| EP | 1 508 357 A1 | 2/2005 |
| EP | 1 508 358 A1 | 2/2005 |
| EP | 1 612 197 A1 | 1/2006 |
| EP | 1 964 823 A1 | 9/2008 |
| JP | B2-3121497 | 12/2000 |
| JP | A-2001-162119 | 6/2001 |
| JP | A-2001-190916 | 7/2001 |
| JP | A-2002-177719 | 6/2002 |
| JP | A-2004-283669 | 10/2004 |
| JP | A-2005-154202 | 6/2005 |
| KR | 2006-84403 A | 7/2006 |
| KR | 2006-93106 A | 8/2006 |
| WO | WO 03/048072 A1 | 6/2003 |
| WO | WO 03/067041 A1 | 8/2003 |
| WO | WO 03/067042 A1 | 8/2003 |
| WO | WO 2005/030364 A1 | 4/2005 |
| WO | WO 2006/075805 A1 | 7/2006 |
| WO | WO 2006/103786 A1 | 10/2006 |
| WO | WO 2007/111279 A1 | 10/2007 |
| WO | WO 2007/116665 A1 | 10/2007 |

OTHER PUBLICATIONS

MNX: http://www.memsnet.org/material/siliconcarbidesic/ (Nov. 21, 2001).*
Ciullo, Peter A., Industrial Minerals and Their Uses: A Handbook and Forumulary, 1996, Noyes Publications, p. 343.*
Shimomura et al., Journal of Materials Science 30 (1995) 3193-3199.*
Jun. 25, 2010 Office Action issued in U.S. Appl. No. 11/951,682.
Oct. 29, 2010 Office Action issued in U.S. Appl. No. 11/951,682.
Mar. 7, 2011 Office Action issued in U.S. Appl. No. 11/951,682.
Feb. 2, 2011 European Search Report issued in European Patent Application No. 07 25 4730.0.
Mar. 4, 2011 Office Action issued in U.S. Appl. No. 12/235,379.
Mar. 3, 2011 Office Action issued in U.S. Appl. No. 12/138,076.
Mar. 22, 2010 Office Action issued in U.S. Appl. No. 12/239,343.
Sep. 17, 2010 Office Action issued in U.S. Appl. No. 12/239,343.
Apr. 29, 2010 Extended European Search Report issued in European Patent Application No. EP 07739550.7.
Feb. 23, 2011 Notice of Allowance issued in U.S. Appl. No. 12/239,343.
Feb. 23, 2010 Office Action issued in U.S. Appl. No. 12/138,076.
Sep. 17, 2010 Office Action issued in U.S. Appl. No. 12/138,076.

* cited by examiner

JOINED BODY AND METHOD FOR MANUFACTURING THE SAME

BACKGROUND OF THE INVENTION AND RELATED ART STATEMENT

The present invention relates to a joined body where a plurality of members to be joined are unitarily joined by means of a bonding material layer and a method for manufacturing the joined body.

A honeycomb structure is widely used as a trapping filter for exhaust gas, for example, a diesel particulate filter (DPF) for trapping and removing particulate matter contained in exhaust gas from a diesel engine or the like.

Such a honeycomb structure has a structure where a plurality of cells functioning as fluid passages partitioned and formed by porous partition walls of, for example, silicon carbide (SiC) are disposed in parallel with one another in the direction of the central axis. In addition, the end portions of adjacent cells are alternately plugged (in a checkerwise pattern). That is, one cell has an open end portion on one side and closed end portion on the other side, and other cells have a closed end portion on one side and an open end portion on the other side.

Such a structure enables exhaust gas to be purified by allowing the exhaust gas to flow into predetermined cells (inflow cells) from one end, to pass through porous partition walls, and to be discharged from the cells adjacent to the inflow cells (outflow cells) in order to trap particulate matter in exhaust gas with the partition walls when the exhaust gas passes through the partition walls.

In order to use such a honeycomb structure (filter) continuously for a long period of time, it is necessary to regularly subject the filter to a regeneration treatment. That is, in order to reduce a pressure loss increased by particulate matter accumulated in the filter with the passage of time to put the filtering performance in the initial state, it is required to remove the particulate matter accumulated in the filter by combustion. However, there is a problem of causing defects such as a crack or a rupture in a honeycomb structure due to large thermal stress which generates upon regeneration of a filter. In order to cope with the demand for improvement of thermal shock resistance against the thermal stress, there has been proposed a honeycomb structure having a divided structure having a function of dispersing and relaxing the thermal stress by unitarily joining a plurality of honeycomb segments with a bonding material layer. Thus, the thermal shock resistance could be improved to some extent.

However, a demand for further enlargement of a filter has been increasing in recent years, and thermal stress generated upon regeneration has been increasing according to this. Therefore, in order to solve the above problem, further improvement in thermal shock resistance as a structure has strongly been desired. In order to realize the movement in thermal shock resistance, a bonding material layer for unitarily joining a plurality of honeycomb segments is required to have excellent stress-relaxing function and bonding strength.

For the purpose of enhancing thermal shock resistance by such improvement of the bonding material layer, there has conventionally been disclosed a ceramic structure where a material for a bonding material layer between honeycomb segments has a Young's modulus of 20% or less with respect to that of a material for the honeycomb segments (JP-A-2001-190916). The honeycomb structure has the bonding material layer having low Young's modulus, thereby lowering thermal stress generated upon use. However, because of the low Young's modulus, bonding strength between honeycomb segments is insufficient when the bonding material layer has high porosity, and sometimes a sound joined body cannot be obtained.

In contrast with this, when the bonding material layer has high Young's modulus, deformation of the honeycomb segments due to thermal distortion can be suppressed by the bonding material layer. However, since it increases stress applied on the bonding material layer, there arises a problem that the bonding material layer is prone to break only by raising the Young's modulus of the bonding material layer.

SUMMARY OF THE INVENTION

The present invention has been made in view of the aforementioned problems of prior art and aims to provide a joined body formed by unitarily joining two or more members to be joined by means of a bonding material layer formed of a bonding material composition, where the joined body is capable of suppressing deformation of the members to be joined due to thermal distortion with the bonding material layer, hardly causes rupture of the bonding material layer due to stress, and has excellent thermal shock resistance.

In order to achieve the above aim, according to the present invention, there is provided the following joined body and method for producing the joined body.

[1] A joined body formed by unitarily joining two or more members to be joined by means of a bonding material layer formed of a bonding material composition,
wherein the bonding material composition contains flat particles, non-flat particles, and an inorganic adhesive as main components and wherein the bonding material layer has a Young's modulus of 3 GPa or more.

[2] A joined body according to [1], wherein the bonding material composition contains flat particles having a Young's modulus of 100 GPa or more as the flat particles.

[3] A joined body according to [1] or [2], wherein the bonding material composition contains non-flat particles having a Young's modulus of 100 GPa or more as the non-flat particles.

[4] A joined body according to any one of [1] to [3], wherein the bonding material composition contains the flat particles at the ratio of 1 to 60% by mass with respect to a total amount of the main components.

[5] A joined body according to any one of [1] to [4], wherein the flat particles have an aspect ratio of 3 or more.

[6] A joined body according to any one of [1] to [5], wherein the flat particles have an average particle diameter of 1 to 200 μm.

[7] A joined body according to any one of [1] to [6], wherein the flat particles are flat particles formed of one or more kinds of materials selected from the group consisting of mica, talc, and glass flakes.

[8] A bonding material composition according to [7], wherein the mica is mica calcined at 800° C. or more and wherein the talc is talc calcined at 900° C.

[9] A joined body according to any one of [1] to [8] wherein the bonding material layer has a porosity of below 50%.

[10] A joined body according to any one of [1] to [9], wherein the members to be joined are honeycomb segments.

[11] A method for manufacturing a joined body, wherein two or more members to be joined are unitarily joined by using a bonding material composition containing flat particles, non-flat particles, and an inorganic adhesive as the main components and having a Young's modulus of 3 GPa or more after being dried and cured.

Since a joined body of the present invention has a bonding material layer having high Young's modulus of 3 GPa or more, deformation of members to be joined due to thermal distortion can be suppressed with the bonding material layer, and, since flat particles contained in the bonding material composition forming the bonding material layer enhance rupture resistance of the bonding material layer, the bonding material layer is hardly broken by stress, and, as a result, excellent thermal shock resistance is exhibited. In addition, according to a manufacturing method of the present invention, a joined body having such excellent thermal shock resistance can be manufactured.

REFERENCE NUMERALS

Figure 1:
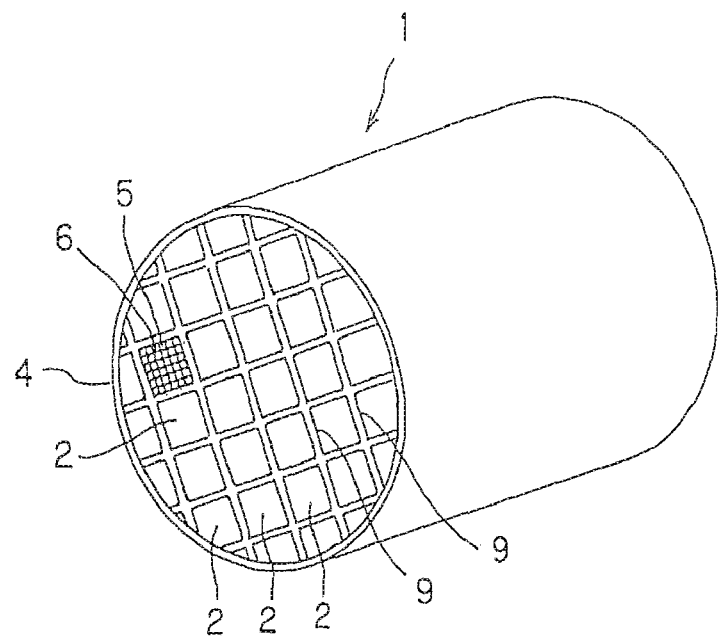
FIG. 1 is a perspective schematic view showing an example of an embodiment of a joined body (honeycomb structure) of the present invention.

1: honeycomb structure, 2: honeycomb segment, 4: coating material, 5: cell, 6: partition wall, 7: filler, 9: bonding material layer

DETAILED DESCRIPTION OF THE INVENTION

Hereinbelow, the present invention will be described on the basis of a specific embodiment. However, the present invention should not be construed by limiting to the embodiment, and various changes, modifications, and improvements may be added thereto based on knowledge of a person of ordinary skill as long as they do not deviate from the range of the present invention.

A joined body of the present invention is formed by unitarily joining two or more members to be joined by means of a bonding material layer formed of a bonding material composition and characterized mainly in that the bonding material composition contains flat particles, non-flat particles, and an inorganic adhesive as main components and that the bonding material layer has a Young's modulus of 3 GPa or more. Here, the phrase, "flat particles, non-flat particles, and an inorganic adhesive as main components" means that the total amount of flat particles, non-flat particles, and an inorganic adhesive is 50% by mass or more with respect to the entire amount of the bonding material composition. In addition, a "flat particle" means a particle having two or more relatively plane faces, two of the plane faces are almost parallel to each other, and a distance between the almost parallel faces is small in comparison with a longer diameter of the faces. Further, a "non-flat particle" means a massive or spherical particle having neither characteristics of the above flat particle nor characteristics regarded as a fiber-shape or a needle-shape.

In a joined body of the present invention, the bonding material layer has a Young's modulus of 3 GPa or more, preferably 4 GPa or more, more preferably 5 GPa or more. Thus, by allowing the bonding material layer joining members to have high Young's modulus, the bonding material layer suppresses deformation of the joined body due to thermal distortion. The Young's modulus of the bonding material layer can be obtained by calculating from a load-displacement curve obtained by cutting out a part of the bonding material layer from the joined body to have a predetermined shape (e.g. stick of 4×1×20 mm) as a test piece and subjecting the test piece to a three-point bending test according to JIS R1602 to measure a displacement when a predetermined load is applied to the test piece.

In addition, in the present invention, the bonding material composition forming the bonding material layer containing flat particles, non-flat particles, and an inorganic adhesive as the main components. Particularly by the flat particles among these main components, rupture resistance of the bonding material layer is enhanced. As described above, there has conventionally been a problem that the bonding material layer of high Young's modulus increases stress applied to the bonding material layer, while it can suppress deformation of a honeycomb segment. However, by the flat particles contained in the bonding material composition, rupture resistance is enhanced, and rupture of the bonding material layer is hardly caused by stress to give a joined body excellent in thermal shock resistance.

From the viewpoint of imparting high Young's modulus to the bonding material layer, it is preferable that flat particles having a Young's modulus of 100 GPa or more are contained as the flat particles in the bonding material composition forming the bonding material layer. In addition, from a similar viewpoint, it is preferable that non-flat particles having a Young's modulus of 100 GPa or more are contained as the non-flat particles in the bonding material composition. Incidentally, Young's modulus of the flat particles and non-flat particles can be calculated from a load-deformation line obtained by measuring a displacement when a predetermined load is applied in a compression test according to JIS R1608 using, for example, a micro-compression tester.

The bonding material composition contains the flat particles at the ratio of preferably 1 to 60% by mass, more preferably 5 to 55% by mass, and furthermore preferably 10 to 50% by mass with respect to the total amount of main components (flat particles, non-flat particles, and an inorganic adhesive) from the viewpoints of strength and rupture resistance of the bonding material layer. When the ratio of the flat particles to the total amount of main components is below 1% by mass, strength and rupture resistance of the bonding material layer may be insufficient. When the ratio is above 60% by mass, application may be difficult.

The flat particles have an aspect ratio of preferably 3 or more, more preferably 4 or more, and furthermore preferably 5 or more from the viewpoints of strength and rupture resistance of the bonding material layer. When the aspect ratio is below 3, a bonding material layer having sufficient strength and rupture resistance may not be obtained.

The flat particles have an average particle diameter of preferably 1 to 200 μm, more preferably 3 to 180 μm, and furthermore preferably 5 to 150 μm from the viewpoints of strength and rupture resistance of the bonding material layer. When the average particle diameter of the flat particles is below 1 μm, a bonding material layer having sufficient strength and rupture resistance may not be obtained. When the average particle diameter is above 200 μm, application may be difficult.

Examples of the material for the flat particles include mica, talc, and glass flakes. In particular, mica can suitably be used. With regard to mica and talc, calcined mica or calcined talc is preferably used because thermal stability of the resultant bonding material layer is enhanced by removing hydroxyl group in the structure in advance. Mica is calcined preferably at 800° C. or more, and talc is calcined preferably at 900° C. or more.

The ratio of the non-flat particles contained as a filler other than the above flat particles in the bonding material composition of the present invention is preferably 1 to 50% by mass, more preferably 5 to 48% by mass, and furthermore preferably 10 to 45% by mass of the total amount of the main components from the viewpoints of strength and rupture resistance of the bonding material layer. When the ratio of the on-flat particles is below 1% by mass, application may be difficult. When the ratio is above 50% by mass, a bonding material layer having sufficient strength and rupture resistance may not be obtained.

The non-flat particles have an average particle diameter of preferably 0.50 to 200 μm, more preferably 0.1 to 150 μm, and furthermore preferably 1 to 100 μm from the viewpoints of strength and rupture resistance of the bonding material layer. When the average particle diameter of the flat particles is below 0.05 μm, application may be difficult. When the average particle diameter is above 200 μm, a bonding material layer having sufficient strength and rupture resistance may not be obtained.

Suitable examples of the material for the non-flat particles include alumina, silica, mullite, zirconia, silicon carbide, silicon nitride, aluminum nitride, and glass.

The ratio of the in organic adhesive contained as a matrix in a bonding material composition of the present invention is preferably 1 to 7.0% by mass, more preferably 5 to 65% by mass, and furthermore preferably 10 to 60% by mass from the viewpoints of strength and rupture resistance of the bonding material layer. When the ratio of the inorganic adhesive is below 1% by mass with respect to the total mass of the amount of main components, application may be difficult. When the ratio is above 70% by mass, sufficient bonding strength may not be obtained.

Examples of the material for the inorganic adhesive include colloidal silica (silica sol) colloidal alumina (alumina sol), other various kinds of metal oxide sols, ethyl silicate, water glass, silica polymer, and aluminum phosphate. Of these, colloidal silica is particularly preferably used because of excellent bonding force, compatibility with a filler, chemical stability, and thermal resistance.

A bonding material composition of the present invention may contain an organic binder, a dispersant, a resin balloon, and water as side components as necessary in addition to the aforementioned main components. Here, the term "resin balloon means" a hollow spherical material made of a resin such as polyacrylonitrile or the like.

In a joined body of the present invention, the bonding material layer has a porosity of preferably below 50%, more preferably below 45%, and furthermore preferably below 40% from the viewpoints of strength, rupture resistance, and Young's modulus of the bonding material layer. When the porosity of the bonding material layer is 50% or more, Young's modulus may not be exhibited sufficiently.

Though the members to be joined of a bonding material composition of the present invention are not particularly limited, they are suitable for bonding ceramic members to be joined to obtain a ceramic structure. They are most suitably used for bonding honeycomb segments to obtain a honeycomb structure to be used for a diesel exhaust gas purification filter, which is exposed to a severe thermal environment upon regenerating the filter.

In a method for manufacturing a joined body of the present invention, two or more members to be joined are unitarily joined by using a bonding material composition containing flat particles, non-flat particles, and an inorganic adhesive as the main components and having a Young's modulus of 3 GPa or more after being dried and cured. The bonding material composition can be manufactured by adding a binder e.g., methyl cellulose (MC) and carboxymethyl cellulose (CMC)), a resin balloon, a dispersant, and water or the like as necessary to a raw material containing the flat particles, non-flat particles, and an inorganic adhesive at predetermined ratios as the main components and mixing together and kneading them using a kneader such as a mixer to be in the form of paste.

Incidentally, when the members to be joined are joined by the use of a bonding material composition of the present invention, the bonding temperature is preferably 1000° C. or less (more preferably 50 to 900° C., and furthermore preferably 100 to 800° C.) from the viewpoint of exhibiting sufficient strength and bonding conditions. Though bonding can be performed with no problem even in the case of above 1000° C., desired characteristics (Young's modulus, etc.) are hardly obtained. Therefore, it is not preferable.

Next, description will be given regarding the case that a joined body of the present invention is a honeycomb structure obtained by bonding a plurality of honeycomb segments (members to be joined) with specific examples of a constitution.

Figure 2:
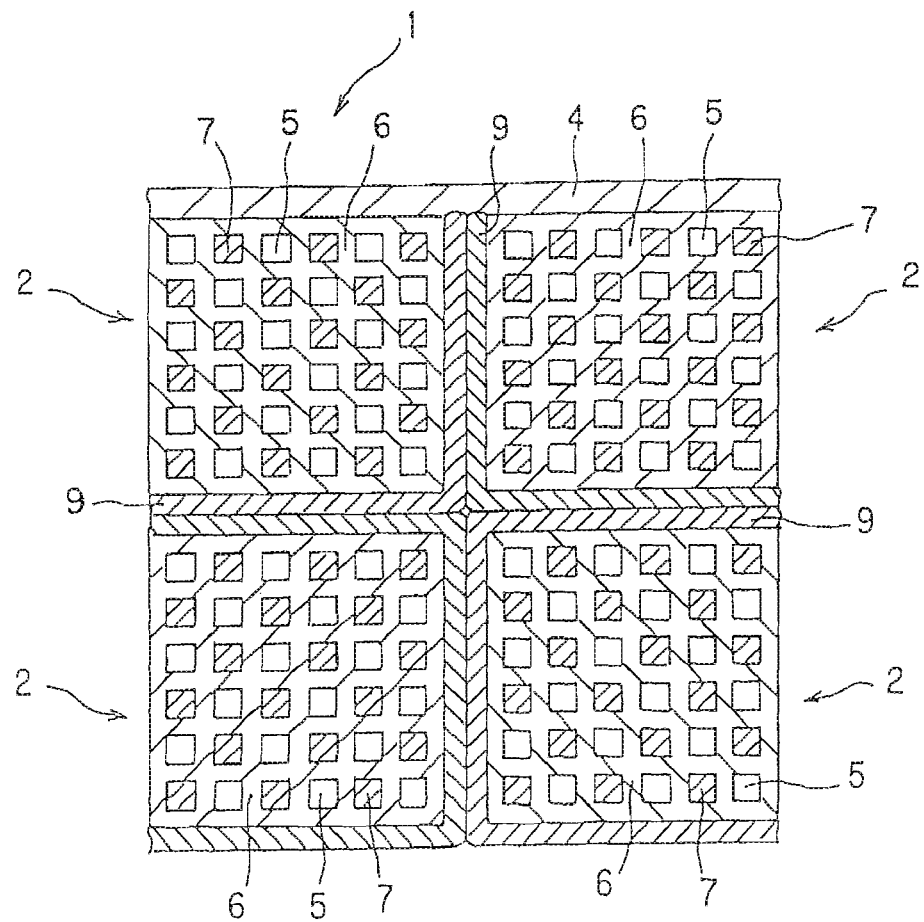
FIG. 2 is an enlarged view of a main portion showing an example of an embodiment of a joined body (honeycomb structure) of the present invention.

As shown in FIGS. 1 and 2, a honeycomb structure 1 has a structure having plurality of cells 5 functioning as fluid passages separated and formed by porous partition walls 6 and being disposed to be in parallel to one another in a direction of the central axis. Honeycomb segments 2 each of which constitutes a part of the whole structure and which are joined together in a direction perpendicular to the central axis of the honeycomb structure 1 to constitute the whose structure are unitarily joined by a bonding material layer 9 formed of a bonding material composition of the present invention to give a honeycomb segment joined body.

The honeycomb segments 2 unitarily joined by a bonding material layer 9 are subjected to grinding in such a manner that a cross-sectional shape of the entire body may have a circle, ellipse, triangle, square, or another desired shape after the joining, and the outer peripheral face is coated with a coating material 4. When the honeycomb structure 1 is used as a DPF, each of the cells 5 in a honeycomb segment 2 is alternately plugged with a filler 7 in one end portion as shown in FIG. 3 and FIG. 4 which is a cross-sectional view taken along the A-A line of the FIG. 3.

Figure 3:
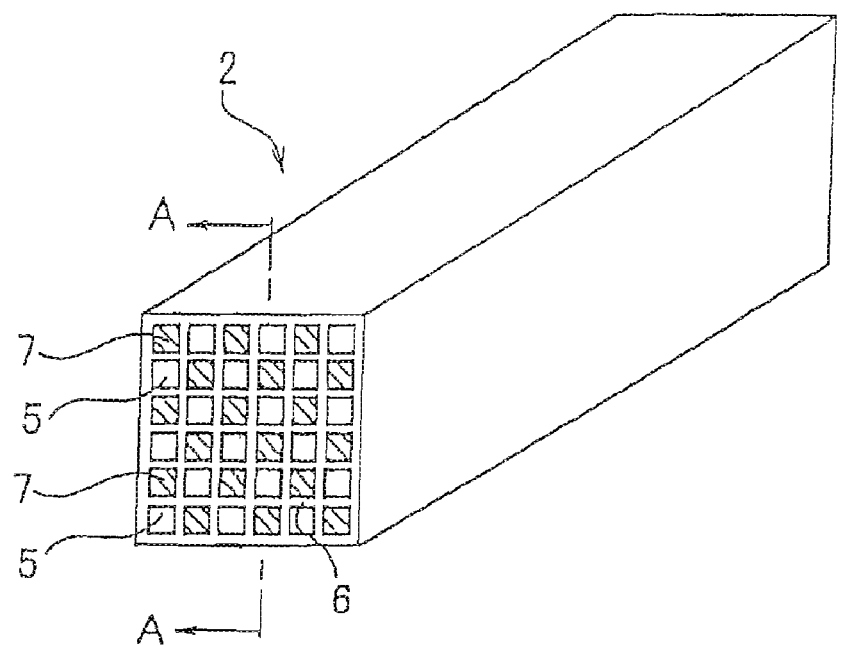
FIG. 3 is a perspective view of a member to be joined (honeycomb segment) constituting a joined body (honeycomb structure) of the present invention.
Figure 4:
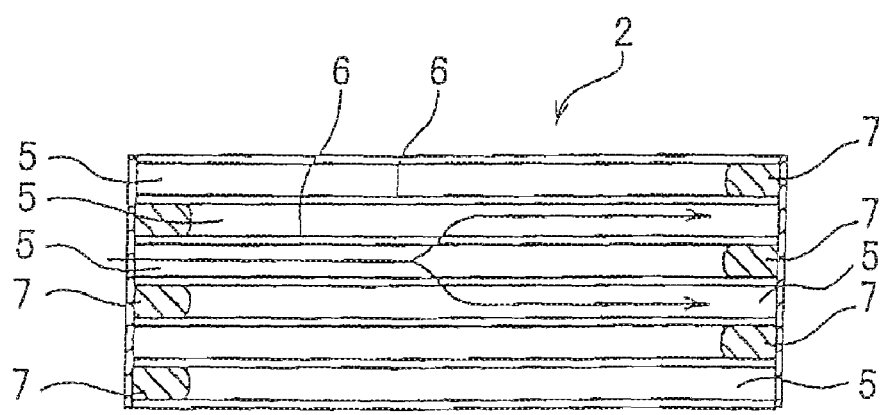
FIG. 4 is a cross-sectional view taken along the A-A line in FIG. 3.

A predetermined cell 5 (Inflow cell) is open on the left end portion side in FIGS. 3 and 4 and plugged with a filler 7 on the right end portion side, and another cell 5 (outflow cell) adjacent to the above cell is plugged with a filler 7 on the left end portion side and open on the right end portion side. By such a plugging, as shown in FIG. 2, the end faces of the honeycomb segments 2 have a checkerwise pattern.

FIG. 4 shows a case where the exhaust gas inlet is on the left side of the honeycomb segment 2. Exhaust gas flows into the honeycomb segment 2 from the cells 5 (inflow cells) which are open without being plugged. The exhaust gas flowing into the cells (inflow cells) passes through the porous partition walls 6 and flows out from other cells 5 (outflow cells). When the exhaust gas pass through the partition walls 6, particulate matter containing soot in exhaust gas is trapped by the partition walls 6. Thus, exhaust gas can be purified. Since a pressure loss increases due to accumulation of the particulate matter containing soot with the passage of time by such trapping, a regeneration treatment to combust soot and the like is regularly performed. Though FIGS. 2 to 4 show a honeycomb segment 2 having a square entire cross-section, the shape may be a shape such as a triangle, hexagon, or the like. In addition, the cell 5 may have a cross-sectional shape of a triangle, hexagon, circle, ellipse, or another shape.

As shown in FIG. 2, the bonding material layer 9 is formed of a bonding material composition of the present invention and coated on the outer peripheral faces of the honeycomb segments 2 to join the honeycomb segments 2 together. Though, the bonding material layer 9 may be coated on the outer peripheral faces of each of the adjacent honeycomb segments 2, it may be coated on only one of the corresponding peripheral faces between two adjacent honeycomb segments 2. Such coating on only one of the corresponding faces is preferable in that the amount of the bonding material layer 9 to be used can be saved. The direction where the bonding material layer 9 is coated may be a longitudinal direction in an outer peripheral face of a honeycomb segment, a direction perpendicular to the longitudinal direction in an outer peripheral face of a honeycomb segment, a direction perpendicular to an outer peripheral face of a honeycomb segment, or the like and is not particularly limited. However, the direction is preferably toward the longitudinal direction of an outer peripheral face of the honeycomb segment. The thickness of the bonding material layer 9 is determined in consideration of bonding force between the honeycomb segments 2 and suitably selected within the range of, for example, 0.5 to 3.0 mm.

The material for the honeycomb segments 2 used in the present embodiment is constituted by at least one selected from the group consisting of silicon carbide (SIC), silicon-silicon carbide-based composite materials formed by using silicon carbide (SiC) as a aggregate and silicon (Si) as a bonding material, silicon nitride, cordierite, mullite, alumina, spinel, silicon carbide-cordierite-based composite materials, lithium aluminum silicate, aluminum titanate, and Fe—Cr—Al-based metals from the viewpoints of strength and thermal resistance. Of these, a material constituted by silicon carbide (SiC) or a silicon-silicon, carbide based composite material is preferable.

The honeycomb segment 2 can be manufactured by adding a binder such as methyl cellulose, hydroxypropoxyl cellulose, hydroxyethyl cellulose, carboxymethyl cellulose, and polyvinyl alcohol, a pore former, a surfactant, and water or the like as a solvent to a material suitably selected from the aforementioned materials to obtain kneaded clay having plasticity; subjecting the kneaded clay to extrusion forming so as to give the aforementioned shape; drying the formed article by microwaves, hot air, or the like; and sintering the dried article.

The material for the filler 7 used for plugging the cells 5 may be the same material as that for the honeycomb segments 2. Plugging by the filler 7 can be performed by immersing an end face of the honeycomb segment 2 in a slurried filler in the state that the cells 5 to be unplugged are masked to fill the filler in the opening cells 5. Though the filler 7 may be filled before or after firing after forming the honeycomb segment 2, it may preferably be filled before firing because only one firing step is required.

After the honeycomb segments 2 are prepared as described above, a bonding material composition the form of paste is applied on an outer peripheral face of each honeycomb segment 2 to form a bonding material layer 9. A plurality of honeycomb segments 2 are joined to form a predetermined shape (entire structure of the honeycomb structure 1) and subjected to press-fitting in this joined state, followed by heat-drying. Thus, a joined body having a plurality of honeycomb segments 2 unitarily joined together is manufactured. Then, the joined body is subjected to grinding into the aforementioned shape, and the outer peripheral faces are coated with a coating material 4, followed by heat-drying. Thus, a honeycomb structure 1 shown in FIG. 1 is manufactured. As a material for the coating material 4, a material similar to that for the bonding material layer 9 can be used. The thickness of the coating material 4 is suitably selected within the range from 0.1 to 1.5 mm.

EXAMPLE

The present invention will hereinbelow be described in more detail on the basis of Examples. However, the present invention is by no mean limited to these Examples.

Example 1

Manufacture of Honeycomb Segment (Member to be Joined))

As a raw material for a honeycomb segment, there was prepared kneaded clay having plasticity by mixing a SiC powder and a metal Si powder at a mass ratio of 80 to 20 to give a mixture, and adding a pore former, an organic binder, a surfactant, and water to the mixture. The kneaded clay was subjected to extrusion forming and drying to obtain a honeycomb segment formed article having a partition wall thickness of 310 μm, a cell density of about 46.5 cells/cm$^2$ (300 cells/in$^2$), a square cross section of 35×35 mm, and a length of 152 mm. Plugging was performed on both the end faces of the honeycomb segment formed article in a checkerwise pattern. That is, plugging was performed in such a manner that adjacent cells were plugged on the opposite end portion. As the plugging material, the same material as the raw material for the honeycomb segment was used. After the plugging and drying, the binder was removed at about 400° C. in an ambient atmosphere, and the honeycomb segment was fired at about 1450° C. in an Ar inert atmosphere to bond SiC crystal grains with Si. Thus, a honeycomb segment having a porous structure was obtained.

(Preparation of Bonding Material Composition)

A dispersant, a resin balloon, and an organic binder (CMC) were mixed with mixture of flat particles and/or non-flat particles under the conditions shown in Tables 1 and 2, and colloidal silica was further added thereto as an inorganic adhesive, and kneading was performed for 30 minutes with a mixer to obtain paste-formed bonding material compositions (bonding material compositions No. 1 to 16) which were different from one another in the kinds and the composition ratio. Incidentally, calcined mica used as flat particles in the bonding material composition No. 13 was calcined at 800° C., and calcined talc used as flat particles in the bonding material composition No. 14 was calcined at 900° C. The ratio of the flat particles, non-flat particles, and inorganic adhesive, which were the main components, is shown by mass % with respect to the total amount of the components as 100 in Tables 1 and 2. The ratio of the dispersant, resin balloon, and organic binder, which were the side components, is shown by mass % as superaddition with respect to the total amount of the components as 100. The aspect ratio of the flat particles was calculated as the "longer diameter/thickness" of the particles. The "longer diameter" and the "thickness" were measured by observation with an electron microscope. That is, the thickness was measured by observing the flat particle from an arbitrary direction perpendicular to the direction of the thickness of the flat particle and image-analysis the electron micrograph. In addition, the longer diameter was measured by image-analysis the same image with a length perpendicular to a thickness direction of the particle being employed as a longer diameter. This measurement was carried out with respect to 10 or more particles selected at random from a vision of the observation, and the average value of the values of the aspect ratio was employed as the aspect ratio of the flat particles.

(Manufacture of Honeycomb Structure (Joined Body))

The bonding material composition No. 1 was coated on the outer wall faces of the honeycomb segment to form a bonding material layer, and another honeycomb segment was mounted thereon. The steps were repeated to obtain a honeycomb segment-stacked body composed of 16 (4×4) honeycomb segments. After bonding all the segments by suitably applying pressure from outside, they were dried at 140° C. for two hours to obtain a honeycomb segment-joined body. After grinding the outer periphery of the honeycomb segment-joined body into a cylindrical shape, the outer peripheral face was coated with a coating material, followed by drying and curing at 700° C. for two hours to obtain a honeycomb structure.

(Evaluation on Bonding Material Layer of Joined Body)

With respect to the bonding material layer (bonding material composition after curing) of the honeycomb structure obtained above, there were obtained the strength, Young's modulus, and porosity according to the following methods. The results are shown in Table 3.

Strength:

A part of the bonding material layer was cut out from the honeycomb structure to have a predetermined shape (e.g., 4×1×20 mm) as a test piece, and the strength was calculated by subjecting the test piece to the three-point bending test according to JIS R1601.

Young's Modulus:

A displacement of the test piece was measured when a predetermined load was applied on the test piece in the above strength test, and the Young's modulus was calculated from a load-displacement curve (according to JIS R1602).

Porosity:

A part of the bonding material layer was cut out from the honeycomb structure to have an arbitrary shape (e.g., 10×10×1 mm), and the porosity was calculated by the Archimedes' method.

(Evaluation on Honeycomb Structure)

The joining conditions of the obtained honeycomb structure were observed according to the following method, and a quick heating test (burner spalling (B-sp) test), a quenching test (electric furnace spalling (E-sp) test), and an engine test (E/G test) were performed. The results are shown in Table 3.

Joining Conditions:

Conditions at the joint after joining and curing were visually observed, and bonding strength was observed by the hand sense of touch. A condition of no crack or defect with firm joining conditions was expressed with "good", and a condition of easily peeling off or coming off or the conditions of many cracks or defects was expressed with "bad".

Quick Heating Test (Burner Spalling (B-sp) Test):

In this test, evaluation for thermal shock resistance was given from temperature at which no crack is caused (The higher the temperature is, the higher the thermal shock resistance is.) by making a temperature difference between the central portion and the outside portion by sending hot air heated by a burner into the honeycomb structure.

Quenching Test (Electric Furnace Spalling (E-sp) Test):

After the honeycomb structure was heated at 550° C. for two hours to have uniform temperature (450° C.), it was taken out at room temperature. The honeycomb structure was evaluated for thermal shock resistance by presence/absence of a crack. "Good" was given for no crack, and "bad" was given when a crack was caused.

Engine Test (E/G Test):

The honeycomb structure was evaluated for thermal shock resistance by presence/absence of a crack in a condition that the temperature of the central portion of the honeycomb structure is 1000° C. by combusting accumulated particulate matter for filter regeneration. "Good" was given for no crack, and "bad" was given when a crack was caused.

Examples 2 to 14, Comparative Examples 1 to 2

The honeycomb structures were manufactured in the same manner as in Example 1 except that the bonding material composition No. 1 in Example 1 was replaced with the bonding material compositions Nos. 2 to 16 shown in Tables 1 and 2. The honeycomb structures (Examples 2 to 14, Comparative Examples 1 and 2) were evaluated and tested in the same manner as in Example 1. The results are shown In Table 2.

TABLE 1

| Bonding material composition No. | Flat particle | | | | | Non-flat particle | |
|---|---|---|---|---|---|---|---|
| | Material | Young's modulus [GPa] | Aspect ratio | Average particle diameter [μm] | Ratio to main components [mass %] | Material | Young's modulus [GPa] |
| 1 | Mica | 180 | 15 | 40 | 30 | SiC | 400 |
| 2 | Mica | 180 | 20 | 40 | 30 | SiC | 400 |
| 3 | Mica | 180 | 23 | 40 | 30 | SiC | 400 |
| 4 | Mica | 180 | 20 | 20 | 30 | SiC | 400 |
| 5 | Mica | 180 | 20 | 50 | 30 | SiC | 400 |
| 6 | Mica | 180 | 20 | 40 | 20 | SiC | 400 |
| 7 | Talc | 170 | 6 | 15 | 30 | SiC | 400 |
| 8 | Talc | 170 | 6 | 20 | 30 | SiC | 400 |

| Bonding material composition No. | Non-flat particle | | Inorganic adhesive | | Other components |
|---|---|---|---|---|---|
| | Average particle diameter [μm] | Ratio to main components [mass %] | Material | Ratio to main components [mass %] | Ratio to main components (superaddition) [mass %] |
| 1 | 1.5 | 40 | Colloidal silica | 30 | Dispersant: 0.15 Resin balloon: 0.5 Organic binder: 0.1 |
| 2 | 1.5 | 40 | Colloidal silica | 30 | Dispersant: 0.15 Resin balloon: 0.5 Organic binder: 0.1 |

TABLE 1-continued

| | | | | | |
|---|---|---|---|---|---|
| 3 | 1.5 | 40 | Colloidal silica | 30 | Dispersant: 0.15<br>Resin balloon: 0.5<br>Organic binder: 0.1 |
| 4 | 1.5 | 40 | Colloidal silica | 30 | Dispersant: 0.15<br>Resin balloon: 0.5<br>Organic binder: 0.1 |
| 5 | 1.5 | 40 | Colloidal silica | 30 | Dispersant: 0.15<br>Resin balloon: 0.5<br>Organic binder: 0.1 |
| 6 | 1.5 | 60 | Colloidal silica | 30 | Dispersant: 0.15<br>Resin balloon: 0.5<br>Organic binder: 0.1 |
| 7 | 1.5 | 40 | Colloidal silica | 30 | Dispersant: 0.15<br>Resin balloon: 0.5<br>Organic binder: 0.1 |
| 8 | 1.5 | 40 | Colloidal silica | 30 | Dispersant: 0.15<br>Resin balloon: 0.5<br>Organic binder: 0.1 |

TABLE 2

| Bonding material composition No. | Flat particle | | | | | Non-flat particle | |
|---|---|---|---|---|---|---|---|
| | Material | Young's modulus [GPa] | Aspect ratio | Average particle diameter [μm] | Ratio to main components [mass %] | Material | Young's modulus [GPa] |
| 9 | Glass flakes | 70 | 15 | 40 | 30 | SiC | 400 |
| 10 | Glass flakes | 75 | 15 | 40 | 30 | SiC | 400 |
| 11 | Glass flakes | 70 | 60 | 160 | 30 | SiC | 400 |
| 12 | Glass flakes | 75 | 60 | 160 | 30 | SiC | 400 |
| 13 | Calcined mica | 180 | 20 | 42 | 30 | SiC | 400 |
| 14 | Calcined talc | 170 | 6 | 16 | 30 | SiC | 400 |
| 15 | Mica | 180 | 20 | 40 | 30 | SiC | 400 |
| 16 | — | — | — | — | — | SiC | 400 |

| Bonding material composition No. | Non-flat particle | | Inorganic adhesive | | Other components |
|---|---|---|---|---|---|
| | Average particle diameter [μm] | Ratio to main components [mass %] | Material | Ratio to main components [mass %] | Ratio to main components (superaddition) [mass %] |
| 9 | 1.5 | 40 | Colloidal silica | 30 | Dispersant: 0.15<br>Resin balloon: 0.5<br>Organic binder: 0.1 |
| 10 | 1.5 | 40 | Colloidal silica | 30 | Dispersant: 0.15<br>Resin balloon: 0.5<br>Organic binder: 0.1 |
| 11 | 1.5 | 40 | Colloidal silica | 30 | Dispersant: 0.15<br>Resin balloon: 0.5<br>Organic binder: 0.1 |
| 12 | 1.5 | 40 | Colloidal silica | 30 | Dispersant: 0.15<br>Resin balloon: 0.5<br>Organic binder: 0.1 |
| 13 | 1.5 | 40 | Colloidal silica | 30 | Dispersant: 0.15<br>Resin balloon: 0.5<br>Organic binder: 0.1 |
| 14 | 1.5 | 40 | Colloidal silica | 30 | Dispersant: 0.15<br>Resin balloon: 0.5<br>Organic binder: 0.1 |
| 15 | 1.5 | 40 | Colloidal silica | 30 | Dispersant: 0.15<br>Resin balloon: 3<br>Organic binder: 0.1 |
| 16 | 1.5 | 6.5 | Colloidal silica | 35 | Dispersant: 0.15<br>Resin balloon: 0.5<br>Organic binder: 0.1 |

TABLE 3

|  | Bonding material composition No. | Strength of Bonding Material layer [MPa] | Young's modulus of bonding material layer [GPa] | Porosity of bonding material layer [%] | Bonding condition | B-sp test [° C.] | E-sp test | E/G test |
|---|---|---|---|---|---|---|---|---|
| Example 1 | 1 | 10 | 8 | 44 | Good | 800 | Good | Good |
| Example 2 | 2 | 11 | 9 | 45 | Good | 900 | Good | Good |
| Example 3 | 3 | 14 | 9 | 43 | Good | 900 | Good | Good |
| Example 4 | 4 | 10 | 8 | 42 | Good | 700 | Good | Good |
| Example 5 | 5 | 13 | 9 | 44 | Good | 800 | Good | Good |
| Example 6 | 6 | 10 | 10 | 38 | Good | 700 | Good | Good |
| Example 7 | 7 | 9 | 6 | 40 | Good | 700 | Good | Good |
| Example 8 | 8 | 9 | 7 | 41 | Good | 800 | Good | Good |
| Example 9 | 9 | 7 | 5 | 45 | Good | 700 | Good | Good |
| Example 10 | 10 | 8 | 5 | 46 | Good | 800 | Good | Good |
| Example 11 | 11 | 7 | 6 | 46 | Good | 700 | Good | Good |
| Example 12 | 12 | 7 | 5 | 47 | Good | 800 | Good | Good |
| Example 13 | 13 | 12 | 9 | 48 | Good | 900 | Good | Good |
| Example 14 | 14 | 10 | 6 | 42 | Good | 700 | Good | Good |
| Comp. Ex. 1 | 15 | 0.9 | 0.8 | 75 | Bad | Impossible | impossible | Impossible |
| Comp. Ex. 2 | 16 | 2.2 | 4 | 42 | Good | 500 | Bad | Bad |

(Discussion)

As shown in Table 3, Examples 1 to 14 of the present invention showed high strength of the bonding material, good bonding conditions, and excellent thermal shock resistance. In contrast, Comparative Example 1, where the bonding material layer has a Young's modulus of below 3 GPa, bonding conditions were bad due to deterioration in strength of the bonding material layer as a result of raising porosity of the bonding material layer in order to lower the Young's modulus, and even the tests for evaluation for thermal shock resistance could not be conducted Comparative Example 2, where flat particles were not contained in the bonding material composition forming the bonding material layer thermal shock resistance deteriorated though bonding conditions were good.

INDUSTRIAL APPLICABILITY

The present invention can suitably be used in manufacturing a coined body obtained by unitarily joining a plurality of members to be joined, for example, honeycomb structure obtained by unitarily joining a plurality of honeycomb segments and used for a DPF, or the like.

What is claimed is:

1. A joined body formed by unitarily joining two or more members to be joined by means of a bonding material layer formed of a bonding material composition,
   wherein the bonding material composition contains flat particles having a Young's modulus of 100 GPa of more, non-flat particles, and an inorganic adhesive as main components, and
   wherein the bonding material layer has a Young's modulus of 3 GPa or more.

2. A joined body according to claim 1, wherein the bonding material composition contains non-flat particles having a Young's modulus of 100 GPa or more as the non-flat particles.

3. A joined body according to claim 1, wherein the bonding material composition contains the flat particles in an amount of 1 to 60% by mass with respect to a total amount of the main components.

4. A joined body according to claim 1, wherein the flat particles have an aspect ratio of 3 or more.

5. A joined body according to claim 4, wherein the flat particles have an average particle diameter of 1 to 200 µm.

6. A joined body according to claim 1, wherein the flat particles are flat particles formed of one or more kinds of materials selected from the group consisting of mica, talc, and glass flakes.

7. A joined body according to claim 6, wherein the mica is mica calcined at 800° C. or more and wherein the talc is talc calcined at 900° C.

8. A joined body according to claim 1, wherein the bonding material layer has a porosity of below 50%.

9. A joined body according to claim 1, wherein the members to be joined are honeycomb segments.

10. A method for manufacturing a joined body, wherein two or more members to be joined are unitarily joined by using a bonding material composition containing flat particles having a Young's modulus of 100 GPa or more, non-flat particles, and an inorganic adhesive as the main components and having a Young's modulus of 3 GPa or more after being dried and cured.

11. A bonding material composition, comprising flat particles having a Young's modulus of 100 GPa or more, non-flat particles, and an inorganic adhesive as main components,
   wherein a Young's modulus of the composition is 3 GPa or more when the composition is dried and cured.

12. A bonding material composition according to claim 11, wherein the non-flat particles have a Young's modulus of 100 GPa or more.

13. A bonding material composition according to claim 11, wherein the flat particles are present in an amount of 1 to 60% by mass with respect to a total amount of the main components.

14. A bonding material composition according to claim 13, wherein the flat particles have an aspect ratio of 3 or more.

15. A bonding material composition according to claim 14, wherein the flat particles have an average particle diameter of 1 to 200 µm.

16. A bonding material composition according to claim 15, wherein the flat particles are flat particles formed of one or more kinds of materials selected from the group consisting of mica, talc, and glass flakes.

17. A bonding material composition according to claim 16, wherein the mica is mica calcined at 800° C. or more and wherein the talc is talc calcined at 900° C.

* * * * *